Jan. 27, 1948. F. B. ADAM 2,435,113
BUSDUCTS FOR ELECTRICAL DISTRIBUTION SYSTEMS
Filed July 24, 1943 4 Sheets-Sheet 1

INVENTOR.
FREDERICK B. ADAM
BY Don A. Fischer ATTY.

Jan. 27, 1948. F. B. ADAM 2,435,113
BUSDUCTS FOR ELECTRICAL DISTRIBUTION SYSTEMS
Filed July 24, 1943 4 Sheets-Sheet 2

INVENTOR.
FREDERICK B. ADAM
BY Don A. Fischer ATT'Y.

Jan. 27, 1948.  F. B. ADAM  2,435,113
BUSDUCTS FOR ELECTRICAL DISTRIBUTION SYSTEMS
Filed July 24, 1943  4 Sheets-Sheet 4

INVENTOR.
FREDERICK B. ADAM
BY Don A. Fischer ATT'Y.

Patented Jan. 27, 1948

2,435,113

UNITED STATES PATENT OFFICE 2,435,113

BUS DUCT FOR ELECTRICAL DISTRIBUTION SYSTEMS

Frederick B. Adam, St. Louis, Mo., assignor to Frank Adam Electric Company, St. Louis, Mo., a corporation of Missouri Application July 24, 1943, Serial No. 496,260

7 Claims. (Cl. 174—99)

This invention relates to bus ducts for electrical distribution systems.

It is an object of this invention to provide an improved bus duct and arrangement of bus bars therein for use in an alternating current electrical distribution system. It is well known in the power transmission art that spacing phase conductors of a multiphase transmission system very close together reduces the inductive reactance of the system. If a number of conductors in parallel are used for a phase conductor the inductive reactance of the system is reduced by interlacing the phases so that different phase conductors are adjacent. In a single phase system spacing conductors of opposite polarity closely adjacent achieves the same result. It is also well known in the transmission art that a symmetrical arrangement of phase conductors reduces the inductive reactance of the system. These results are known from practical experience and can be shown from the mathematical formulae for inductance of a transmission circuit.

The bus duct provided by this invention makes possible an arrangement of multi-phase conductors whereby opposite phases may be closely spaced with respect to each other and thereby reduce the inductive reactance of the bus duct system, thus preventing a large voltage drop. This invention provides a manner of achieving this result in existing bus duct distribution systems.

It has been common heretofore to provide bus duct for use in polyphase distribution systems wherein the current per phase was split among a plurality of bus bars. In some cases the individual bus bars per phase were connected in shunt or parallel relation to each other and insulated one from the other with the maximum allowable spacing between those bars constituting different legs of the same phase. In other cases it is desirable to provide bus bars for the respective phases in series. Where the bus bars for a given phase are connected in series it is advantageous to arrange them as close together as possible, but insulated one from the other so as to achieve the reduction of inductive reactance referred to above. Where however, the respective bus bars constituting a phase are connected in shunt relation, it is desirable to provide adjacent each a bus bar connected to a different phase.

The duct provided by this invention provides an insulator support structure fitted with spacers and separators which prevent chipping of the insulators and at the same time space the adjacent bus bars accurately and with the required insulation there-between.

The bus duct structure provided by this invention makes use of a plurality of bus bars for each phase, but the arrangement is such that the bus bars may be connected in any desired circuit relation.

Further objects and advantages will appear from the following detailed description and from the accompanying drawings.

Referring now to the drawings.

Figure 1:
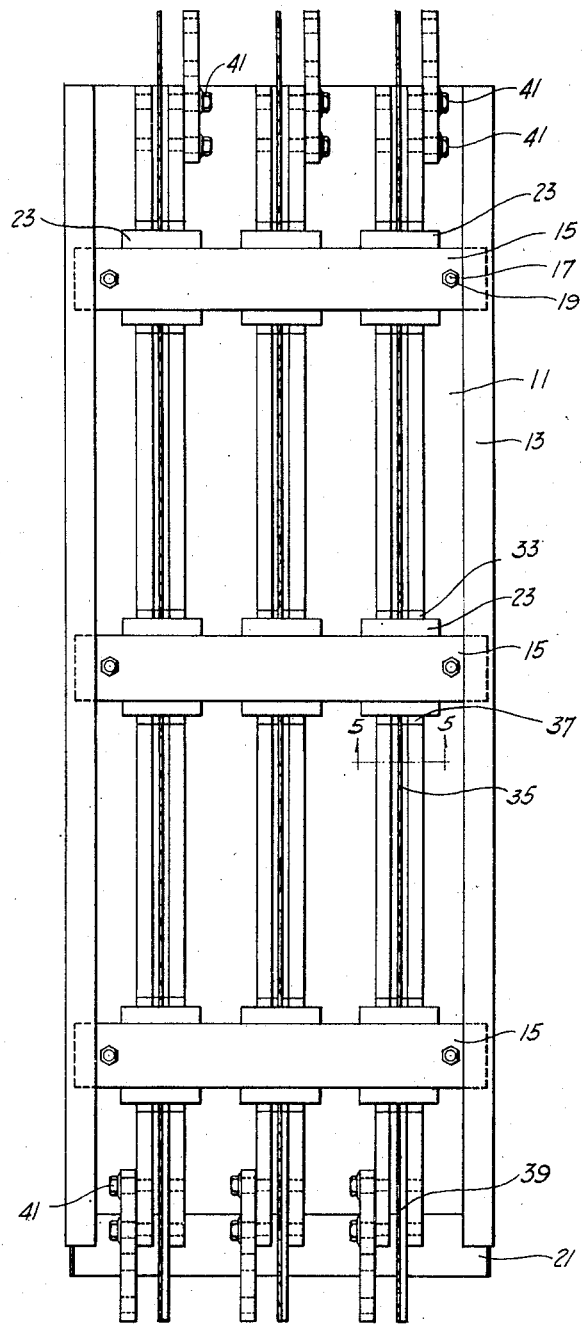
Fig. 1 is a bottom view of a bus duct section with the cover removed to show the bus bars.

Bus duct is usually assembled in sections which may vary in length, according to the manufacturer and the particular requirements for which it is designed. Fig. 1 shows such a section although obviously not to scale.

This invention may be adapted to bus duct of the type shown in United States Patents Nos. 2,216,870 and 2,310,919.

In the drawings numeral 11 indicates the bus duct casing or enclosure which is shown in Fig. 1, with the bottom removed. The enclosure may be provided with flanges 13 if it is of the type shown in U. S. Patents Nos. 2,216,870 and 2,310,919. Channel members 15 extend transversely of the duct and are supported from bolts or rods 17 by means of nuts 19. Each channel may carry a number of insulators, depending on the number of bus bars or phases to be carried in the bus duct. The duct as shown is adapted for use in a three-phase system with two bus bars for each phase.

Figure 5:
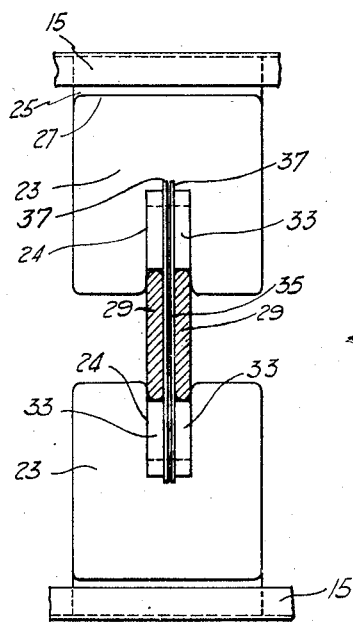
Fig. 5 is an enlarged partial cross-sectional view taken along line 5—5 of Fig. 1.
Figure 6:
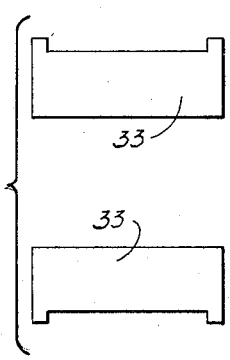
Fig. 6 is a side view of one of the support blocks 33 used to support and space the bus bars.

An enlarged view of one of the insulator supports 23 is shown in Fig. 5. These insulators may be constructed of porcelain or other material effective for the same purpose. To support the bus bars two similar insulators are oppositely disposed as shown in Fig. 5. Slots 24 are provided in each of the insulators and serve to support the bus bars and insulator assembly to be described. The bus bars 29 may be of copper or other conductive material and in Fig. 5 are shown with rounded edges. These bus bars are spaced from the bottom of the slots 24 by spacer blocks 33 which may be of fibre or other material. They should preferably be of some material that will not chip or fracture. These spacer blocks are shown in detail in Fig. 6. The extensions or lugs at opposite ends of the spacer blocks serve to prevent these blocks from sliding out of the insulators 23. Between each bus bar and extending the full length of the bus duct may be a strip of flexible insulation 35. This may be a continuous strip or a number of overlapping strips. This insulation may be of a type which comprises a web of glass fibers embedded in a continuous sheet of flexible plastic which is a well known electrical insulation material. The latter has been found satisfactory for the purpose.

Figures 2, 3, 4:
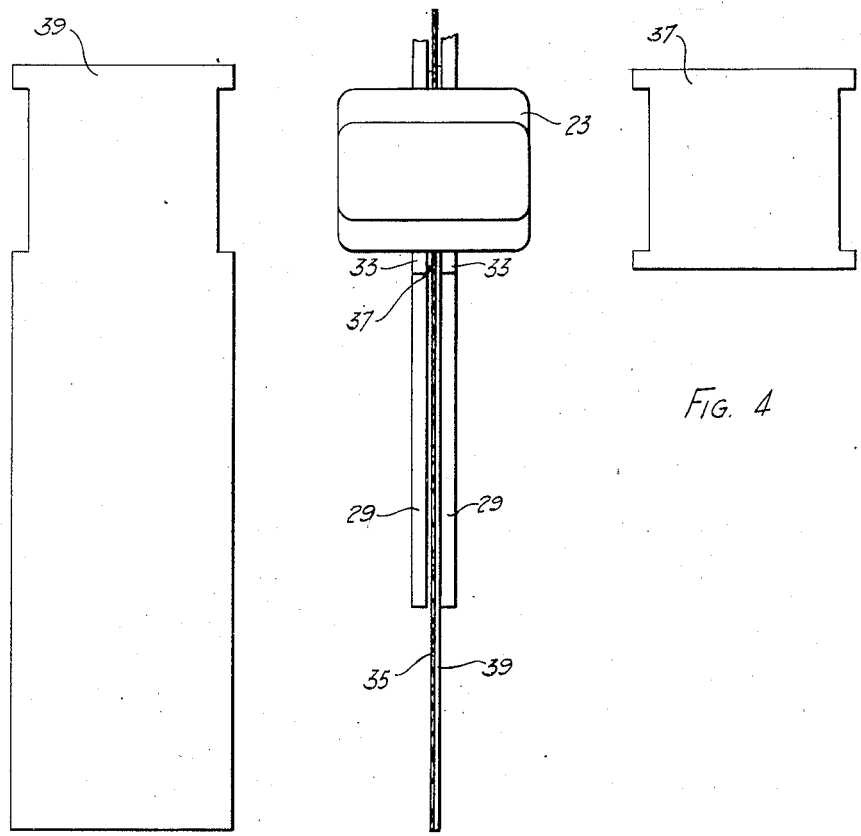
Fig. 2 is an enlarged plan view of a single insulator and the bus bars extending therethrough at the end of a duct section.
Fig. 3 is a side view of the rigid piece of insulation used at the end of each duct section between adjacent bus bars.
Fig. 4 is a side view of one of the reinforcing members used at the insulator supports for the flexible insulation.

At each of the insulator supports 23 a reinforcing member 37 for the flexible insulation is supplied. A pair of these members are disposed on opposite sides of the flexible insulation and prevent it from curling over or falling out of place. A detailed view of one of these members is shown in Fig. 4. These reinforcing members may also be provided with lugs or extensions at opposite ends to prevent their sliding out of the insulators 23. At the end of each duct section one of the members 37 may be omitted and in its place an extended reinforcing member 39 may be provided (see Fig. 3). This member extends, as is shown in Figs. 1 and 2, from the last insulator to the end of the bus bar or beyond.

It can be seen that the flexible insulation 35 and the members 37 occupy the full depth of the insulator slot while the bus bars extend only a short distance into these slots. This arrangement extends the creepage path between the edges of adjacent bus bars so as to avoid flash-overs. The flexible insulation 35 may be glued or otherwise secured to the extended reinforcing member 39. This construction makes it possible to prevent the flexible insulation falling from between adjacent bus bars and insures that when the next section of bus duct is joined, proper insulation will be provided between adjacent bus bars. While the extended member 39 is shown on only one end of the bus duct in Fig. 1, it may be desirable in some instances to provide such members at both ends of the bus duct instead of only one end. Instead, if desired, a pair of such members might be supplied at one end of each section rather than just one as shown. The bus bars of an adjoining section of bus duct are joined by means of bolts 41 which may be threaded into tapped openings in the bus bars. Space between bus bar groups must be provided, obviously, so that the bolts 41 may be tightened.

While the drawings show the invention as applied to a polyphase system, it could be equally effective with a single phase system where only one insulator need be used.

Figure 7:
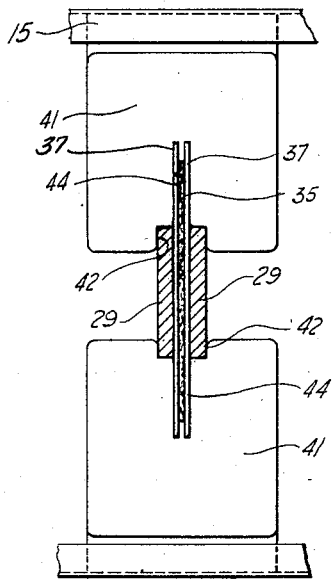
Fig. 7 is a cross-sectional view of an optional form of insulator which may be used.

Certain modifications of the main insulator supports may be made in order to omit the insulator blocks 33. Thus under some conditions where fracture of the main insulators is not feared, it is possible to provide a main insulator as is shown in Fig. 7 and indicated by the numeral 41 in which the slot 42 is not as deep as in the insulator 23 previously described, and may thus serve to support the bus bars without the intervention of insulator blocks 33. A deeper and narrower slot 44 is then provided to accommodate the supports 37 and the flexible insulation 35. The other features of the construction remain the same. The construction shown in Fig. 5 has certain advantages over this latter construction, in that the insulator block 33 acts as a cushion and prevents the bus bars from breaking the porcelain insulator 23 when they are positioned during assembly or when they are jarred while an assembled duct section is in transit. The danger of fracture arises when a material such as porcelain or glass is used as a main insulator. The blocks are made of some material not readily cracked or fractured.

Figure 8:
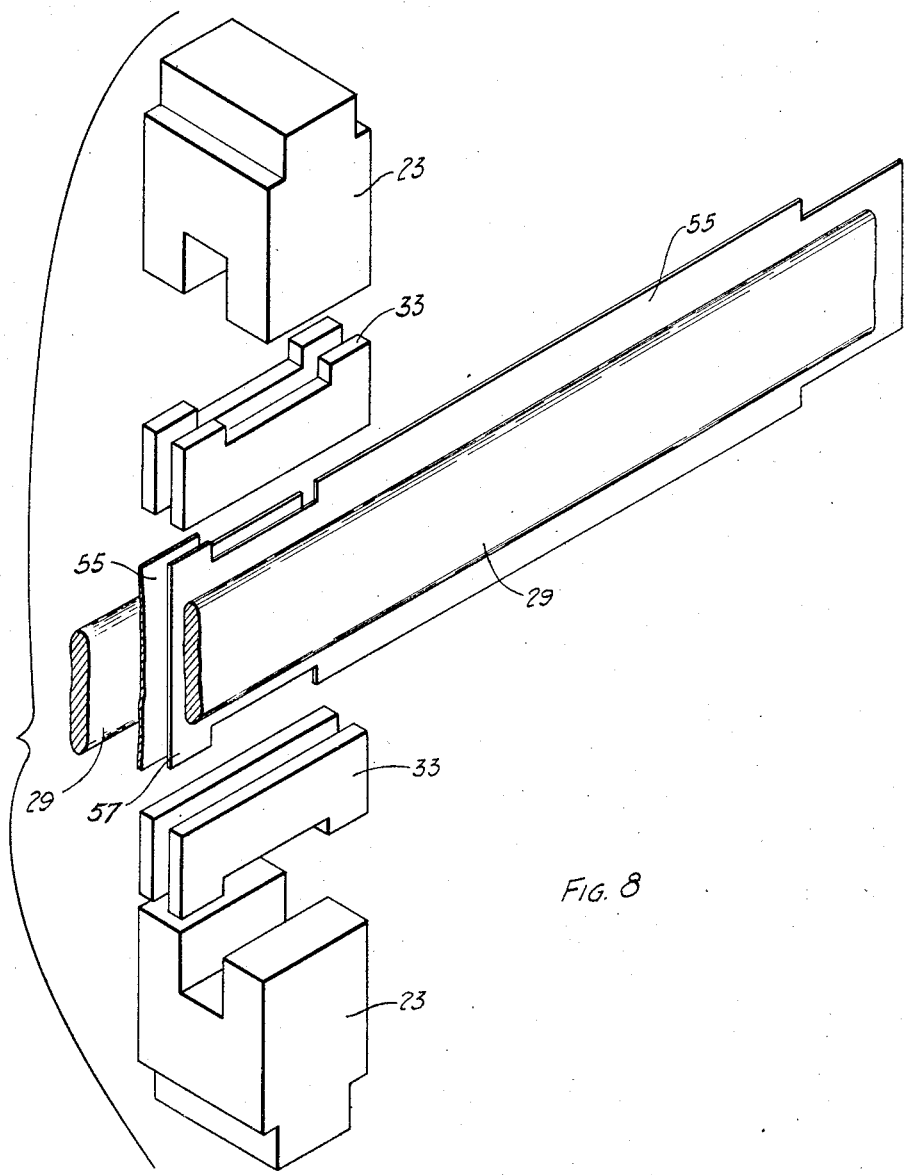
Fig. 8 is an exploded view of a modified form of construction.

In Fig. 8 is shown another modification of the system in which the flexible insulation 35 is replaced by more rigid insulating members 55. These members may be formed similar to members 39 previously described and serve as insulation between the bus bars. As shown, each member 55 is of insulating material and extends from one insulator support to the next. At either or both ends the member may be formed to have lugs 57 extend therefrom and engage the sides of the insulator supports. These lugs prevent longitudinal movement of the insulating members. It might be desirable in some instances to have the member 55 extend between more than one set of insulator supports. The main insulator blocks 23 are as previously described and are related to the bus duct as previously described in connection with Fig. 1.

While I have shown and described only several embodiments of this invention, it is to be understood that the invention is not to be limited thereby, but is defined by the following claims.

I claim:

1. In a bus bar distribution system, a plurality of bus bars, main insulator supports for said bus bars, said insulator supports being provided with slots adapted to accommodate said bus bars therein, oppositely disposed spacer blocks of insulating material positioned in the bottom of said slots, a strip of insulating material co-extensive with said bus bars, between bus bars and positioned in the slots of the insulator supports between said bus bars and spacer blocks and extending beyond the edges of the bus bars.

2. In a bus bar distribution system, a pair of bus bars, a plurality of pairs of opposed insulator supports each of said insulator supports being provided with a slot adapted to accommodate the pair of bus bars, the slots of each pair of insulator supports opposing each other, a plurality of support blocks in the bottom of said slots positioned to support and space the bus bars from the bottom of said slots, a strip of insulating material co-extensive with said bus bars and positioned between the pair of bus bars and between support blocks and extending beyond the edges of the bus bars throughout the length of the bus bars, and a reinforcing member of insulating material extending between the bottoms of the slots of opposing insulator supports and positioned to support the strip of insulating material.

3. In a bus bar distribution system, a plurality of bus bars, a plurality of pairs of opposed insulators for said bus bars, said insulator pairs being provided with oppositely disposed slots for accommodating the bus bars, a plurality of support blocks positioned in the bottom of said slots and arranged to space and support the bus bars from the bottom of said slots, a strip of flexible insulating material co-extensive with the bus bars and positioned between bus bars and extending beyond the edges of the bus bars, a relatively rigid reinforcing member positioned in the slots of a pair of insulators and adapted to support the flexible insulating material and prevent it from curling or falling out of position.

4. A bus bar distribution system comprising a plurality of standardized lengths of bus bars arranged in pairs extending side by side, a plurality of pairs of opposed insulator supports for each pair of bus bars, the insulator supports provided with complementary slots therein to accommodate said bus bars, a plurality of support blocks positioned in the bottom of said slots and arranged to support and maintain the bus bars in a position intermediate the bottom of said slots, a strip of flexible insulating material coextensive with said bus bars, positioned between the bus bars and extending beyond the edges of said bus bars, a reinforcing member of relatively rigid insulating material positioned in the slots of opposed insulators contiguous with the flexible insulating material and adapted to maintain said flexible insulating material in proper position, an extending support of insulating material positioned adjacent said flexible insulating member in the insulator pair at the end of a standardized section and extending from said insulator pair to the end of the bus bars of said standardized section.

5. In a bus bar distribution system, a plurality of standardized sections, each of said sections comprising a plurality of bus bars arranged side by side in pairs, a plurality of pairs of opposed insulators, each pair of insulators provided with complementary slots therein adapted to accommodate a pair of bus bars, a plurality of support blocks positioned at the bottom of said slots and arranged to support and position said bus bars intermediate the bottom of the slots of the insulators, a long thin strip of flexible insulating material positioned between the pair of bus bars positioned in a slot, an extended insulating member positioned between adjacent bus bars of a pair positioned in the slots of the insulators, said member being supported in the pair of insulators near the end of each duct section and extending from said insulators to substantially the end of the bus bars of the duct section, said extended insulating member being adapted for interconnection of bus duct sections to provide additional insulation between bus bar connections of adjacent sections and also to lend support to the flexible insulating material.

6. In a bus bar distribution system, a plurality of bus bars, a plurality of pairs of complementary insulator supports, each of said insulator supports being provided with complementary slots therein facing each other, means maintaining the bus bars in spaced relation to the bottom of said slots, a strip of flexible insulating material extending substantially the length of the bus bars and being of substantially wider dimensions than said bus bars positioned between bus bars and extending for the full depth of the slots in said insulator supports, said bus bar spacing means being provided with means to prevent longitudinal movement out of said slots, reinforcing members positioned adjacent the flexible insulating material at each pair of insulator supports, said reinforcing members being adapted to provide additional support to the flexible insulating material, said reinforcing members provided with means to prevent their longitudinal movement out of said insulator slots.

7. In a bus bar distribution system, an enclosure, a plurality of opposed pairs of insulator supports positioned longitudinally therein, opposite and complementary slots in each pair of insulator supports, a plurality of bus bars in each slot, means spacing the bus bars intermediate the bottoms of said slots, an insulating member positioned between said bus bars substantially wider than said bus bars and extending between the bottoms of the slots of opposed insulators and a plurality of reinforcing members extending between the bottoms of the slots of opposed insulators adjacent the insulating member and adapted to maintain the insulating member in proper position.

FREDERICK B. ADAM.

REFERENCES CITED

The following references are of record in the file of this patent:

UNITED STATES PATENTS

| Number | Name | Date |
| --- | --- | --- |
| 2,059,986 | Frank et al. | Nov. 3, 1936 |
| 2,230,423 | Bassette et al. | Feb. 4, 1941 |
| 2,288,078 | Fisher et al. | June 30, 1942 |
| 2,318,859 | Huguelet | May 11, 1943 |
| 2,263,038 | Heim | Nov. 18, 1941 |
| 2,262,067 | Togesen et al. | Nov. 11, 1941 |
| 2,372,267 | Frank et al. | Mar. 27, 1945 |
| 2,356,006 | Samer | Aug. 15, 1944 |